US006253956B1

(12) United States Patent
Khan et al.

(10) Patent No.: US 6,253,956 B1
(45) Date of Patent: Jul. 3, 2001

(54) AUTOMATED PRODUCT DELIVERY APPARATUS FOR RETAILING PRODUCTS TO A VEHICLE OCCUPANT

(75) Inventors: Zafar Khan, Newton; Melissa Chadwick, Cambridge, both of MA (US)

(73) Assignee: Momentex, LLC, Cambridge, MA (US)

( * ) Notice: Subject to any disclaimer, the term of this patent is extended or adjusted under 35 U.S.C. 154(b) by 0 days.

(21) Appl. No.: 09/374,424

(22) Filed: Aug. 13, 1999

Related U.S. Application Data

(60) Provisional application No. 60/096,430, filed on Aug. 13, 1998.

(51) Int. Cl.[7] ....... B23Q 7/04
(52) U.S. Cl. ....... 221/211; 186/53
(58) Field of Search ....... 221/211, 278; 186/52, 53, 55; 406/1, 2, 3

(56) References Cited

U.S. PATENT DOCUMENTS 3,647,026 * 3/1972 Alexander et al. ....... 186/53

FOREIGN PATENT DOCUMENTS

403288991 * 12/1991 (JP) ....... 186/53

* cited by examiner

*Primary Examiner*—Kenneth W. Noland
(74) *Attorney, Agent, or Firm*—Cesari and McKenna

(57) ABSTRACT

For automated retail product delivery to drivers, a retractable apparatus linked to a retail product dispenser brings the dispensed retain products within reach of the drivers. The apparatus delivers the retail products to vehicle occupants while they are seated in the vehicle. It may be activated electrically or pneumatically or mechanically by the weight of the retail product itself.

3 Claims, 1 Drawing Sheet

AUTOMATED PRODUCT DELIVERY APPARATUS FOR RETAILING PRODUCTS TO A VEHICLE OCCUPANT

RELATED APPLICATION

This application claims the benefit of Provisional Application No. 60/096,430, filed Aug. 13, 1998.

FIELD OF THE INVENTION

This invention relates generally to an automated dispenser for dispensing retail products.

BACKGROUND OF THE INVENTION

Often during the course of travel a driver, and/or other vehicle occupants, may desire a refreshment or travel aid. The driver must detour the vehicle into a rest stop or a road-side business and, in most cases, must also park and exit the vehicle to obtain a refreshment or desired item. For instance, although conventional vending machines are commonplace at travel stops and are also easy-to-use, they are designed for the pedestrian customer and cannot be accessed by the driver from within a vehicle. Some businesses, such as fast-food restaurants, may dispense their products through a drive-through window service wherein an employee takes the order, accepts the payment, and delivers the goods. However, despite the use of advance ordering techniques, these employee-intensive transactions require a person to place the product within reach of the vehicle occupant. As a result, a driver seeking a simple refreshment during travel must suffer either an inconvenience or a travel delay by exiting the vehicle to collect the products, or businesses must have a human or other labor intensive method to deliver the products to the vehicle occupant.

Therefore, what is needed is dispensing apparatus that provides the driver, and other vehicle occupants, with a quick and convenient means for collecting refreshments and other basic consumer products for use in the course of travel without exiting their car and without human interaction. Such a system should operate under the constraints of traffic safety, space limitations, driver interfacing, and high vehicle volume and through-put.

SUMMARY OF THE INVENTION

The invention comprises apparatus for the automated retailing of refreshments and other basic consumer products to a vehicle occupant as the vehicle passes through an automated retail product dispensing station. Examples of locations that could accommodate such automated retail product dispensing stations include tollbooths, parking facilities, roadside rest areas, and fast-food "drive-through restaurants". In each case, a vehicle occupant places a retail product order (remotely, with an automated interface, or through human interaction), drives within reach of an automated retail product dispenser, and the retail product is dispensed by a mechanism that places it within reach of the vehicle driver. The invention thus is a mechanism or apparatus that enables vehicle occupants to collect retail products while they are on the road or roadside, without leaving the confines of their vehicle. This is particularly useful for customers who routinely pass through an automated retailing station and therefore benefit by the time-saving features of the retail product delivery mechanism.

In the preferred embodiment, the invention is incorporated into a toll plaza equipped with an electronic toll collection (ETC) system and automated retailing infrastructure (automated ordering, billing, and dispensing hardware and software systems). See application Ser. No. 09/241,998, filed Feb. 9, 1999, the contents of which is hereby incorporated by reference herein. Those skilled in the art will recognize that this invention has applications in toll systems without ETC and in stand-alone locations. Preferably, a vehicle occupant places a remote order for one or more products prior to vehicle entry into the toll lane, through a transponder, on-board computer, or hand-held electronic device, modified to transmit a product order to the automated retailing system. An automated product dispenser, typically located within the toll lane, dispenses the ordered product(s) within reach of the driver of the vehicle. In certain situations, such as at highway toll lanes, the product dispenser may be located outside of the toll lane to prevent vehicle congestion.

As part of the automated product dispenser, there is a retractable mechanism to deliver retail products to the vehicle. Linked to the automated retail product dispenser and the tollbooth is a device that moves the retail product from the dispenser to within reach of the driver of the vehicle. This mechanism places the retail product in position such that the driver can complete the toll transaction and retrieve the retail product at one location with one stop. This mechanism delivers the product to the driver while seated in the vehicle and may be activated mechanically by the weight of the retail product, electrically, or pneumatically. In some versions, the retail product dispenser will be positioned to deliver the product after the tollbooth.

BRIEF DESCRIPTION OF THE DRAWINGS

The invention description below refers to the accompanying drawings, in which.

DETAILED DESCRIPTION OF AN ILLUSTRATIVE EMBODIMENT

Figure 1:
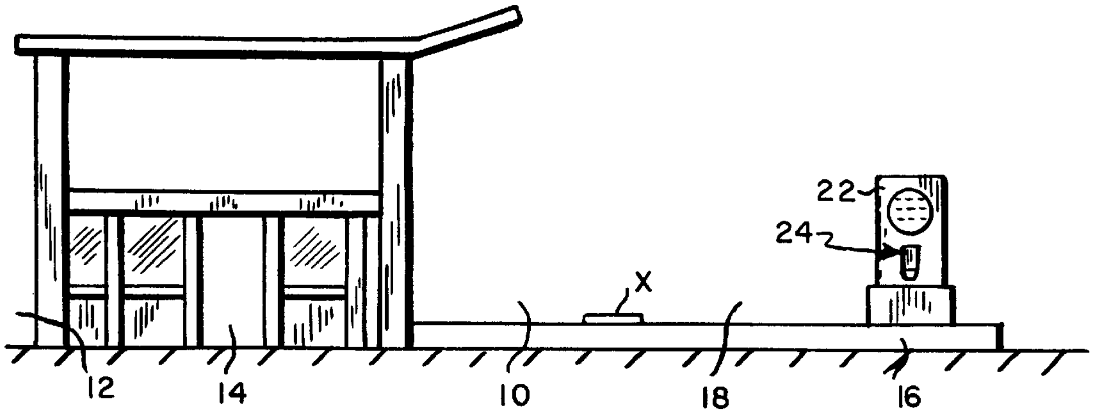
FIG. 1 is a diagrammatic view of an electronic toll lane with and in-lane automated dispenser incorporating the invention.

FIG. 1 illustrates an electronic toll collection (ETC) toll lane 10 incorporating the invention. The ETC toll lane may be a part of a toll plaza comprising one or more ETC toll lanes, any number of which may be configured to provide for drive-through purchasing and dispensing of refreshments and basic consumer products consumed in the course of travel, in addition to the collection of tolls. Examples of these products include soft drinks, coffee, snacks (candy bars, gum, life-savers, etc.), water, aspirin, toiletries (tissue, wipes, etc.), lottery tickets, and travel entertainment (games, puzzles, etc.).

The ETC toll lane 10 has an entrance area 12, a transaction area 14, a dispensing location 16 and an exit area 18. The system identifies an approaching vehicle, or, more precisely, identifies an electronic account from which the toll charge is to be debited.

The driver, or another vehicle occupant, enters the product order into a modified transponder that is carried with the vehicle or orders at a driver-interface ordering point such as those found at drive through restaurants. Those skilled in the art will recognize that the order interface may be equipped with an alternative means for the entry of a product order, such as a voice activation and recognition system to permit voice entry of a product order. The ordering point may be located within the transaction area and may also be integrated with a toll ticket dispenser/reader, a coin/token collection mechanism, or similar toll function.

Figure 2:
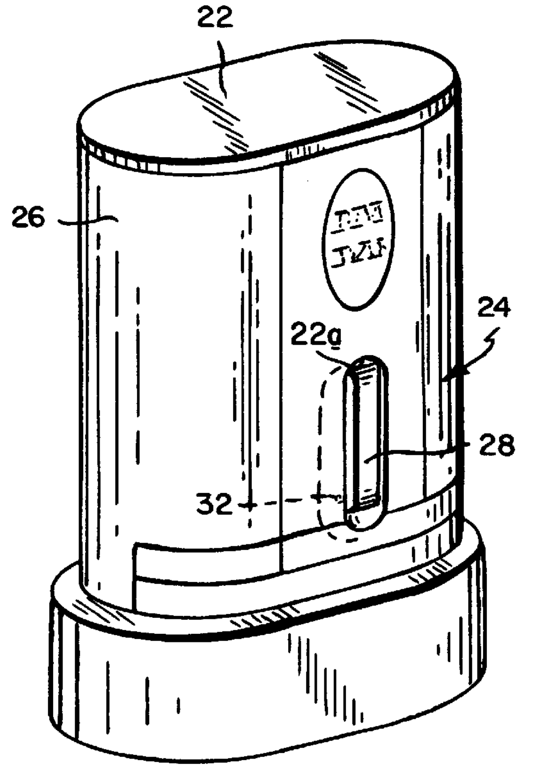
FIG. 2 is a right front perspective view of an automated retail product dispenser showing the dispenser's dispensing arm in a retracted position.

As shown in FIGS. 1 and 2, an automated retailed product dispenser 22 incorporating the invention is preferably located at the dispensing location 16 in the exit area 18. The automated retail product dispenser has a unique dispenser and/or delivery apparatus shown generally at 24 that enables the driver to collect the retail products without leaving the vehicle. The dispenser and/or delivery apparatus includes a protective casing 26 to protect the dispenser against damage from passing vehicles and harmful elements such as sand and salt, and typical vending machine mechanics within the casing (not shown).

The delivery apparatus 24 accommodates multiple retail product orders, withstands accidental bumps by sideview mirrors without damaging the vehicle and operates in inclement weather. It also may be linked to one or more sensor devices to detect vehicle configuration, vehicle window location, etc. for product dispensing purposes. In addition, it is capable of dispensing retail products quickly (i.e. around 1 second).

The retail product, in a beverage size can is some configurations, is delivered to the motorist with the assistance of the subject delivery apparatus 24 which preferably includes a delivery arm 28 whose upper end 28*a* is connected by a hinge or pivot 32 to the front of casing 26. Arm 28 is formed with a chute 34 having a proximal end 34*a* disposed at the usual product exit passage or opening 22*a* in dispenser 22, and a closed distal end 34*b*. The arm 28 is counterbalanced and/or spring-loaded to an upper position shown in FIG. 2, e.g. by a spring 36 when there is no can/retail product in the chute 34. When a can/product is dispensed via the exit passage 22*a* and is channeled into the upper end 34*a* of chute 34, the weight of the can/product overcomes the spring-loading and/or counterbalancing of the arm and causes the arm to swing downward about hinge 32 into a declined attitude shown in FIG. 3. The can/product thereupon slides down the chute to the closed distal end 34*b*, where it is now in close proximity to the window of a motorst's vehicle stopped at a designated service location X (FIG. 1). The shape of the chute end 34*b* prevents the can from rolling onto the roadway, yet is designed to allow the motorist to easily retrieve the beverage. When the can/product is removed from the distal end of the chute 34, the arm returns to its upright position shown in FIG. 2, safely out of the way of vehicles.

Figure 3:
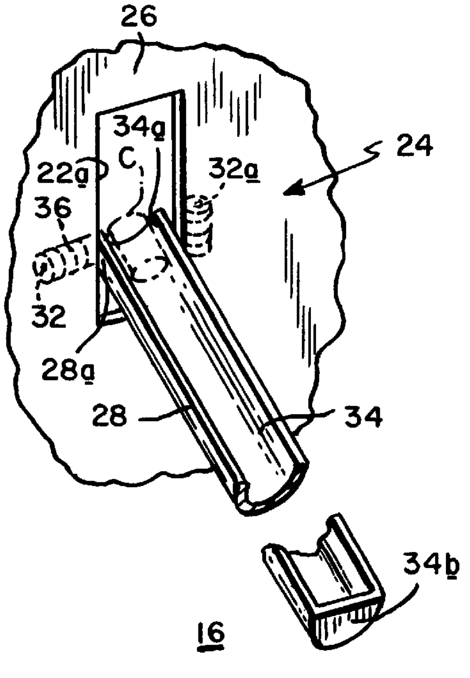
FIG. 3 is a fragmentary perspective view on a larger scale showing the dispenser's arm in an extended position.

In situation s where the retail product does not have the mass required to overcome the counterbalance or spring-loaded arm 28, a typical reversible step motor (not shown) may assist the movement of arm 28 to its lower position shown in FIG. 3. In this embodiment, a sensor (not shown) detects the presence of product at the proximal end 34*a* of the chute and activates the motor to lower the arm. A second sensor (not shown) at the distal end of the chute detects the removal of the product and causes the motor to retract the arm to its upright position shown in FIG. 2, safely out of the way of vehicles.

The shape of the arm 28 is preferably designed so that it is stiff in the vertical direction to support the weight of the beverage can or other product or products , yet is flexible in the horizontal direction to provide flexibility to collisions. In the preferred embodiment, the hinge 32 is a spring-loaded 2-axis hinge 32, 32*a* (FIG. 3) to provide horizontal flexibility. Further, the arm 28 is preferably made of a flexible and durable plastic material, such that impact with a vehicle's fender or outside mirror will not cause damage to the vehicle or to the delivery apparatus 24.

In the preferable embodiment, the delivery arm 28 has a sensor-activated feedback mechanism (not shown) that electrically or mechanically responds to product delivery problems.

If desired, the dispenser may be designed to raise or lower arm 28 as needed to deliver the beverage can-products close to the motorist's window using sensors, and also to rotate the cans to a vertical or slightly tipped-back position to make the cans easier for the motorist to grasp. A more complex system would add an actuator, thereby allowing the delivery arm 28 to modify its delivery position based on feedback about the vehicle's size and/or window height. Those skilled in the art will recognize that this can be accomplished by providing a slightly movable stop for the arm and preserving the gravity arm rotation, or by powering the entire arm pivot 32.

The delivery mechanism is ergonomically designed to facilitate the product pick-up process and to be durable and to look inviting to the driver, and to be simple to use.

The ETC toll lane 10 described above may be situated at a toll road, bridge or tunnel. However, the ETC toll lane 10 is readily adaptable for use at other types of restricted access locations. For example, one or more ETC toll lanes 10 may be situated at the exit of a parking facility.

The present invention offers several advantages over conventional automated retailing delivery systems. Most importantly, the driver of the vehicle does not need to make an extra stop, or even exit the vehicle, to purchase a refreshment. This appeals to commuters yet is also attractive to other driver segments. As commuters are typically time-sensitive and prone to using technology that provides convenience (such as cellular phones), commuters will enjoy the added convenience. Stoics are profiled as drivers who refuse to make any unnecessary detour during a trip for fear of time delay. This invention provides this market segment with a quick beverage/retail product without the despised detour. Families will welcome this invention since in-car product delivery will omit the need to coordinate the kids and car seats. Lastly, women and the elderly will appreciate the invention during inclement weather or at night for safety reasons.

The foregoing has been limited to a specific embodiment of this invention. It will be apparent, however, that variations and modifications may be made to the embodiments, with the attainment of some or all of their advantages. Therefore, it is the object of the appended claims to cover all such variations and modifications as come within the true spirit and scope of the invention.

What is claimed is:

1. An automated delivery apparatus that enables an occupant of a vehicle to collect retail products without exiting the vehicle, said apparatus comprising:

a product dispenser having a product exit passage;

a vehicle service location spaced adjacent to the dispenser, and delivery means associated with the dispenser for delivering a product exiting said passage to a vehicle stopped at said service location, said delivery means including a chute having a proximal end and a distal end, a 2-axis pivot joint connecting the proximal end of the chute to said dispenser adjacent to said passage so that the chute can swing from a retracted position wherein said distal end is located next to said dispenser and an extended position wherein said chute extends outwardly and downwardly from said dispenser toward said service location, said joint allowing horizontal swinging motion of the extended chute so that the chute can withstand impacts with a vehicle at the service location and means for maintaining said chute in said positions.

2. An automated delivery apparatus that enables an occupant of a vehicle to collect retail products without exiting the vehicle, said apparatus comprising:

a product dispenser having a product exit passage;

a vehicle service location spaced adjacent to the dispenser, and delivery means associated with the dispenser for delivering a product exiting said passage to a vehicle stopped at said service location, said delivery means including a chute having a proximal end and a distal end, hinge means connecting the proximal end of the chute to said dispenser adjacent to said exit passage so that the chute can swing from a retracted position wherein said distal end is located next to said dispenser and an extended position wherein said chute extends outwardly and downwardly from said dispenser toward said service location, and means for maintaining said chute in said positions, said maintaining means including means for biasing said arm to said retracted position, said arm being moved to said extended position by the weight of a product at the distal end of the chute.

3. An automated delivery apparatus that enables an occupant of a vehicle to collect retail products without exiting the vehicle, said apparatus comprising;

a product dispenser having a product exit passage;

a vehicle service location spaced adjacent to the dispenser, and delivery means associated with the dispenser for delivering a product exiting said passage to a vehicle stopped at said service location, said delivery means including a chute having a proximal end and a distal end, hinge means consisting of a 2-axis pivot joint connecting the proximal end of the chute to said dispenser adjacent to said exit passage so that the chute can swing from a retracted position wherein said distal end is located next to said dispenser and an extended position wherein said chute extends outwardly and downwardly from said dispenser toward said service location, and means for maintaining said chute in said positions, said maintaining means including first means for biasing said chute to said retracted position, and second means for biasing said chute so that it extends perpendicular from said dispenser in the X-Y plane.

* * * * *